US011188332B2

(12) United States Patent
Battle et al.

(10) Patent No.: US 11,188,332 B2
(45) Date of Patent: Nov. 30, 2021

(54) SYSTEM AND HANDLING OF REGISTER DATA IN PROCESSORS

(71) Applicant: International Business Machines Corporation, Armonk, NY (US)

(72) Inventors: Steven J. Battle, Austin, TX (US); Salma Ayub, Austin, TX (US); Brian D. Barrick, Pflugerville, TX (US); Joshua W. Bowman, Austin, TX (US); Susan E. Eisen, Round Rock, TX (US); Brandon Goddard, Kirkland, WA (US); Cliff Kucharski, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/408,687

(22) Filed: May 10, 2019

(65) Prior Publication Data

US 2020/0356369 A1    Nov. 12, 2020

(51) Int. Cl.
*G06F 9/30* (2018.01)
(52) U.S. Cl.
CPC ...... *G06F 9/30123* (2013.01); *G06F 9/30141* (2013.01)
(58) Field of Classification Search
CPC .................................................. G06F 9/30123
See application file for complete search history.

(56) References Cited

U.S. PATENT DOCUMENTS

| | | | |
|---|---|---|---|
| 6,219,756 B1* | 4/2001 | Kasamizugami | ... G06F 9/30141 365/189.02 |
| 6,425,072 B1 | 7/2002 | Meier et al. | |
| 7,257,695 B2 | 8/2007 | Jiang et al. | |
| 7,974,942 B2 | 7/2011 | Pomroy et al. | |
| 7,996,662 B2 | 8/2011 | Lien et al. | |
| 8,914,615 B2 | 12/2014 | Harris et al. | |
| 9,529,571 B2 | 12/2016 | Van Kampen et al. | |
| 10,007,521 B1 | 6/2018 | Tam et al. | |

(Continued)

OTHER PUBLICATIONS

Roth, A., "Physical Register Reference Counting", IEEE Computer Architecture Letters, vol. 7, No. 1, Jan. 2008.

(Continued)

*Primary Examiner* — Michael J Metzger
(74) *Attorney, Agent, or Firm* — Scully, Scott, Murphy & Presser, P.C.

(57) ABSTRACT

A method, processor and/or system for processing data is disclosed that in an aspect includes providing a physical register file with one or more register file entries for storing data; identifying each physical register file entry with a row identifier to identify the entry row in the physical register file; enabling one or more columns within a target entry row of the physical register file; and revising data in the columns enabled within the target entry row of the physical register file. In an aspect, each physical register file entry is partitioned into a plurality of columns having a bit width and a column mask preferably is used to enable the one or more columns within the target row of the physical register file, and data is revised in only the columns enabled by the column mask.

17 Claims, 12 Drawing Sheets

(56) References Cited

U.S. PATENT DOCUMENTS

| | | | |
|---|---|---|---|
| 2006/0036801 A1* | 2/2006 | Jones | G06F 12/0207 |
| | | | 711/101 |
| 2010/0318766 A1* | 12/2010 | Tsuji | G06F 9/3887 |
| | | | 712/22 |
| 2011/0072438 A1* | 3/2011 | Fiyak | G06F 9/3012 |
| | | | 718/104 |
| 2013/0091339 A1* | 4/2013 | Van Kampen | G06F 7/785 |
| | | | 712/4 |
| 2016/0253181 A1* | 9/2016 | Chadha | G06F 9/30101 |
| | | | 712/216 |
| 2016/0350115 A1 | 12/2016 | Tonnerre et al. | |

OTHER PUBLICATIONS

Tabani, H. et al., "A Novel Register Renaming Technique for Out-of-Order Processors", 2018 IEEE International Symposium on High Performance Computer Architecture, 2018.

* cited by examiner

| Reg # | Col. 0 | Col. 1 | Col. 2 | Col. 3 | Col. 4 | Col. 5 | Col. 6 | Col. 7 |
|---|---|---|---|---|---|---|---|---|
| 1 | (0:3) | (4:7) | (8:11) | (12:15) | (16:19) | (20:23) | (24:27) | (28:31) |
| 2 | (0:3) | (4:7) | (8:11) | (12:15) | (16:19) | (20:23) | (24:27) | (28:31) |
| 3 | (0:3) | (4:7) | (8:11) | (12:15) | (16:19) | (20:23) | (24:27) | (28:31) |
| 4 | (0:3) | (4:7) | (8:11) | (12:15) | (16:19) | (20:23) | (24:27) | (28:31) |
| • | (0:3) | (4:7) | (8:11) | (12:15) | (16:19) | (20:23) | (24:27) | (28:31) |

Fig. 4

| rTag | Column Usage (0:7) | Free? |
|---|---|---|
| 0 | 11110000 | N |
| 1 | 00000000 | Y |
| 2 | 10000000 | N |
| 3 | 11000000 | N |
| 4 | 11100000 | N |

Fig. 5

SYSTEM AND HANDLING OF REGISTER DATA IN PROCESSORS

BACKGROUND OF INVENTION

The present invention generally relates to information handling and data processing systems, processors, and more specifically handling data in registers in a processor.

Modern information and data handling systems and processors often execute instructions out of order to achieve greater processing efficiency. Processors, to handle executing out-of-order instructions, typically are "pipelined" and have multiple elements that operate in parallel to process multiple instructions in a single processing cycle. Pipelining involves processing instructions in stages, so that the pipelined stages may process a number of instructions concurrently. To improve throughput, processors may include multiple pipelines or execution slices within each processor core. Multiple execution slices may be used as part of simultaneous multi-threading (SMT) within a processor core.

Typically a processor pipeline may refer to a set of data processing circuitry or hardware units connected in series within a processor. The processor pipeline usually includes a number of stages, and may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations (targets) to write the results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers and queues associated with the processor, execution units, and/or the issue queue (ISQ) to hold data, information and/or instructions for the execution units.

Out-of-order processors execute instructions as soon as its operands are available (and valid), independent of the original instruction sequence. Consequently, as these processors execute out-of-order instructions, they generate numerous temporary register results. The temporary values are stored together with completed values in register files. The temporary values become complete or permanent values when the corresponding instructions are complete. In out-of-order processors, an instruction can change a register value before all of the prior instructions complete. If any of the prior instructions cause an exception or interruption, then all of the sequential instructions prior to the time of the exception, e.g., an interruptible instruction, will need to be flushed. As a result, the registers allocated to the instruction being flushed will also need to be flushed.

One of the complexities in handling and processing out-of-order instructions is restoring the processor state in the event of an interruptible instruction, e.g., a mispredicted branch instruction. In this regard, registers will need to be restored to the state they were in before the exception, e.g., interruptible instruction. Out-of-order processors typically have a history buffer, e.g., Save & Restore Buffer (SRB), that stores the content of the registers in order to recover the content in the event of an exception. If an exception occurs, for example, a branch mispredict, then typically the content of the logical registers is flushed, and data is recovered from the history buffer, e.g., Save & Restore buffer (SRB), to place the logical registers in the condition that existed before the exception, e.g., the interruptible instruction.

SUMMARY

The summary of the disclosure is given to aid understanding of a computer system, computer architectural structure, processor, and method of handling information including in registers in a processor, and in an aspect dividing the number of entries in registers into multiple columns to reduce the unused bits within a register entry, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

In an embodiment, a method of processing data in a processor is disclosed. The method in an aspect includes providing a physical register file with one or more register file entry rows for storing data; identifying each physical register file entry with a row identifier to identify the entry row in the physical register file; enabling one or more columns within a target entry row of the physical register file; and revising data in the columns enabled within the target entry row of the physical register file. The method in an embodiment further comprises using a column mask to enable the one or more columns within the target row of the physical register file. In one or more embodiments, the method further comprises revising data in only the columns enabled by the column mask within the target entry row of the physical register file while the rest of the columns within the target entry row retain their values. In an aspect, the method further comprises dividing each physical register file entry into a plurality of columns having a bit width, and in one or more embodiments the bit width of each column in the physical register file is the same. The bit width of each column preferably is selected to be the same as the bit width of the smallest register field size or the most common register field size.

The method preferably includes writing data in a column in a physical register file entry row that already has data written to another column in the physical register file entry row. In an embodiment, the method further includes writing data in a plurality of columns in a physical register file entry row. In an aspect, the method includes writing data into another row of the physical register file in response to insufficient space available in an entry row of the physical register file that already has data in one or more columns. The method according to an embodiment further comprises deallocating columns within the physical register file using a column mask.

A system for processing information is also disclosed, and in one or more embodiments the system has at least one processor for processing instructions, where the processor includes one or more logical register mappers having a plurality of fields for storing data; and one or more physical register files having a plurality of entries for storing data wherein the one or more entries are divided into a plurality of columns having a bit width less than the bit width of the physical register file entry, where the one or more logical register mappers have a free list to identify columns that are available to be written. In an embodiment, the physical register file is a control and status register file. According to an aspect, at least one of the logical register mappers is configured and adapted to store for each field a physical register file entry row identifier that identifies an entry row within the physical file register and a column mask to enable or disable a column within an entry row of the physical register file, the entry row identifier and the column mask identifying a physical register file field corresponding to the logical register mapper field. The free list preferably stores column usage data indicating the fields within the physical register file that contain data. The processor according to an embodiment is configured and adapted to write data into one or more adjacent columns of the physical register file using a column mask. In a further embodiment the system has one or more history buffers having a plurality of entries for storing logical register mapper fields evicted from at least one of the logical register mappers. The history buffer preferably stores field data, entry row identifier information, and a column mask of the mapper field evicted from the logical register mapper.

According to one or more embodiments, a system for processing data is disclosed where the system has at least one processor for processing instructions; a physical register file having a plurality of entries for storing data; one or more logical register mappers for mapping logical register fields to the physical register file, each logical register mapper having a plurality of fields for storing data; one or more history buffers associated with the one or more logical register mappers, each history buffer having a plurality of entries for storing fields evicted from at least one of the logical register mappers; and computer readable storage medium comprising program instructions that when executed by the processor cause the processor to partition each physical register file into a plurality of columns having a bit width less than the bit width of the physical register file entry. The processor in an embodiment further has program instructions that when executed by the processor cause a processor to identify each physical register file entry with a row tag to identify the entry row in the physical register file and a column mask to identify each column in the physical register file. In an aspect, the processor further has program instructions that when executed by the processor cause a processor to write data to the correct number of adjacent columns with a target entry row and to write data to only the one or more columns marked with the column mask within a targeted entry row in the physical register file while the rest of the columns within the target entry row retain their values.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the information handling system, computer system, computer architectural structure, processor, physical registers, logical registers, mappers, history buffers, and their method of operation will be better understood when read in conjunction with the figures provided. Embodiments are provided in the figures for the purpose of illustrating aspects, arrangements, features and/or various embodiments of the computer system, computer architectural structure, processor, physical registers, logical registers, mappers, history buffers, e.g., Save & Restore Buffers (SRB), and their method of operation, but the claims should not be limited to the precise arrangement, structures, systems, assemblies, subassemblies, features, aspects, methods, processes, embodiments, or devices shown, and the arrangements, structures, systems, assemblies, subassemblies, features, aspects, methods, processes, embodiments, and devices shown may be used singularly or in combination with other arrangements, structures, systems, assemblies, subassemblies, features, aspects, processes, methods, embodiments, and/or devices.

FIG. 4 illustrates a simplified block diagram of physical registers having multiple fields.

FIG. 5 illustrates a simplified block diagram of an embodiment of a tracker mechanism for a physical register file.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, physical registers, logical registers, mappers, history buffers, e.g., SRBs, and their method of operation, however, it will be understood by those skilled in the art that different and numerous embodiments of the computer system, computer architectural structure, processor, physical registers, logical registers, mappers, history buffers, and their method of operation may be practiced without those specific details, and the claims and invention should not be limited to the embodiments, systems, arrangements, structures, assemblies, subassemblies, features, processes, methods, aspects, features, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and their architecture, which are apparent to those skilled in the art. It is assumed that those skilled in the art are familiar with the general architecture of processors, and in particular, with processors which operate in an out-of-order execution fashion, including multi-slice processors and their use of mappers and history buffers to restore the contents of logical registers. It may be noted that a numbered element is numbered according to the figure in which the element is introduced, and is typically referred to by that number in succeeding figures.

Figure 1:
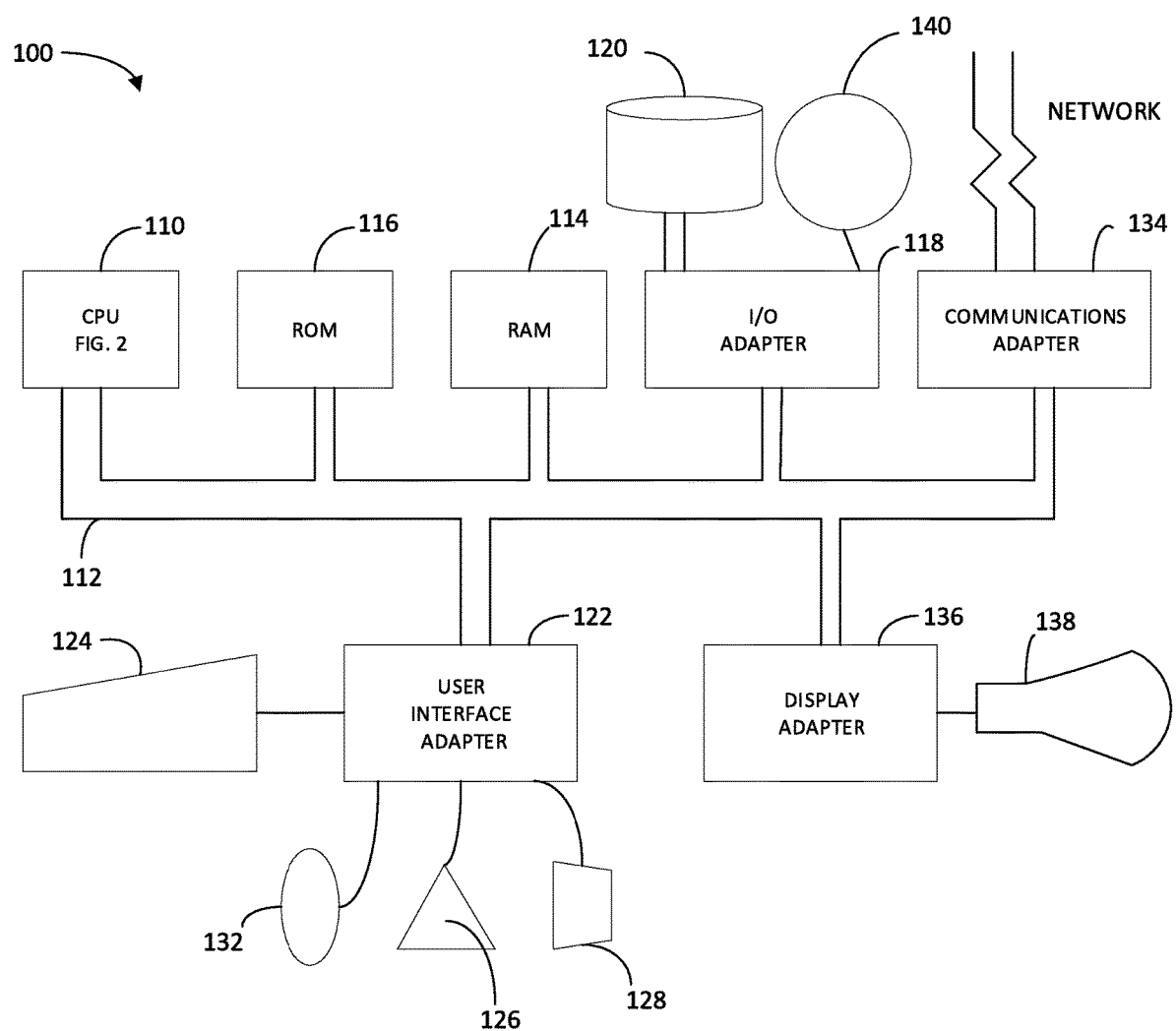
FIG. 1 illustrates an example of a data processing or information handling system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. Processor 110 may have a bus interface unit coupled to the bus 112 for controlling transfers of data and instructions between memory, such as random access memory 114, and caches, e.g. instruction cache (I-Cache) and data cache (D-Cache). Data cache and instruction cache may each have various levels of cache, such as, for example, L1 cache, L2 cache, and/or L3 cache.

I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various logic units, functional units, registers, queues, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
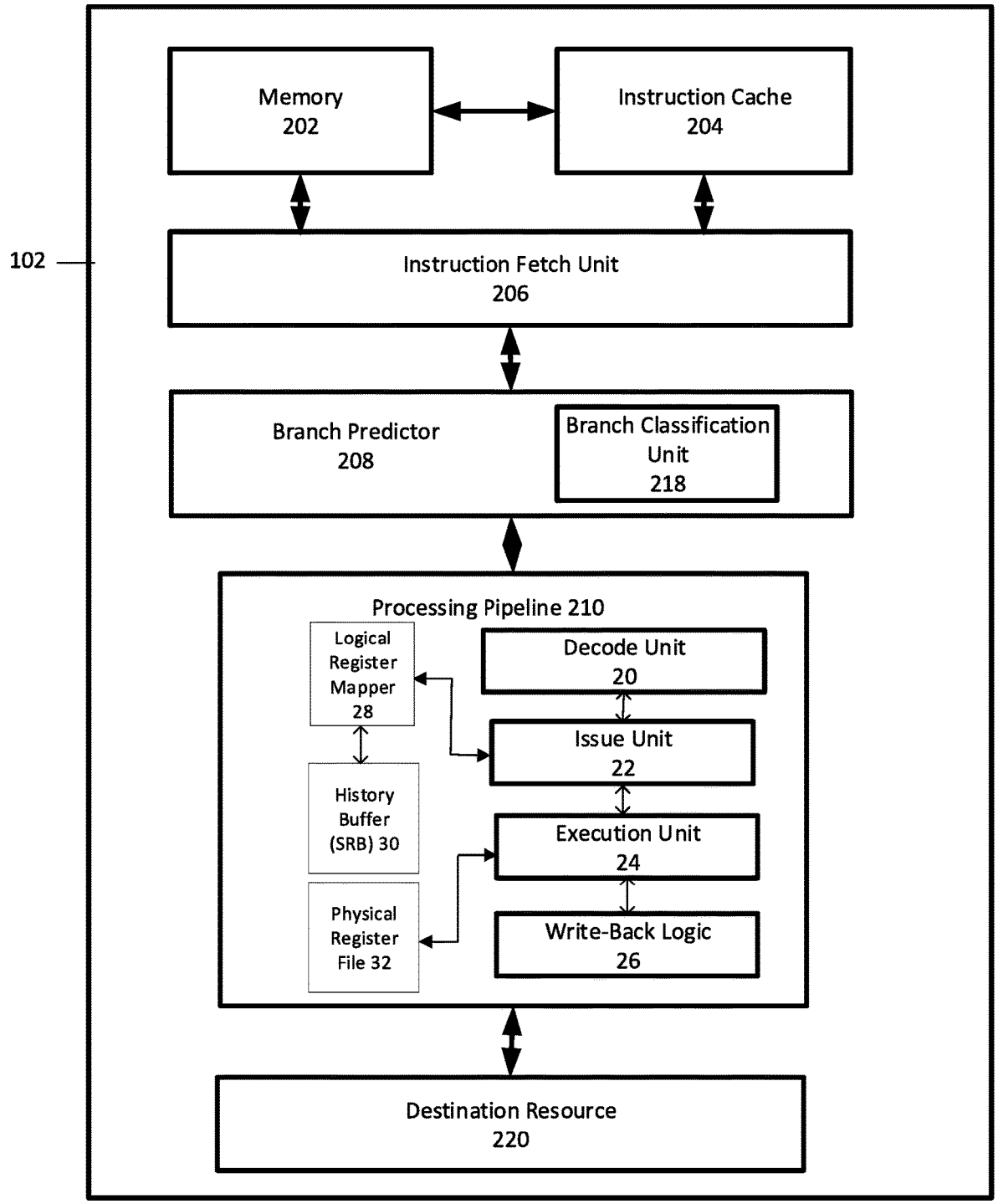
FIG. 2 illustrates a simplified block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 110.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units, vector scaler execution units, and/or other execution units. The logical register mapper 28 contains entries which provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer 30 stores information from the logical register mapper 28 when a new instruction evicts data from the logical register mapper 28 in case the new instruction is flushed and the old data needs to be recovered. The history buffer (SRB) 30 keeps the stored information until the new instruction completes. The history buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further details as relevant will be provided below.

In certain aspects, a CPU 110 may have multiple execution/processing slices with each slice having one or more of the units shown in FIG. 2. For example, each processing slice may have its own processing pipeline 210 with functional/execution units 24. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor, so that multiple threads may be simultaneously executed by the multi-slice processor. Simultaneous processing in multiple slices may considerably increase processing speed of the multi-slice processor. In single-thread (ST) mode a single thread is processed, and in SMT mode multiple threads are processed, e.g., in one or more embodiments two threads (SMT2) or four threads (SMT4) are simultaneously processed.

Figure 3:
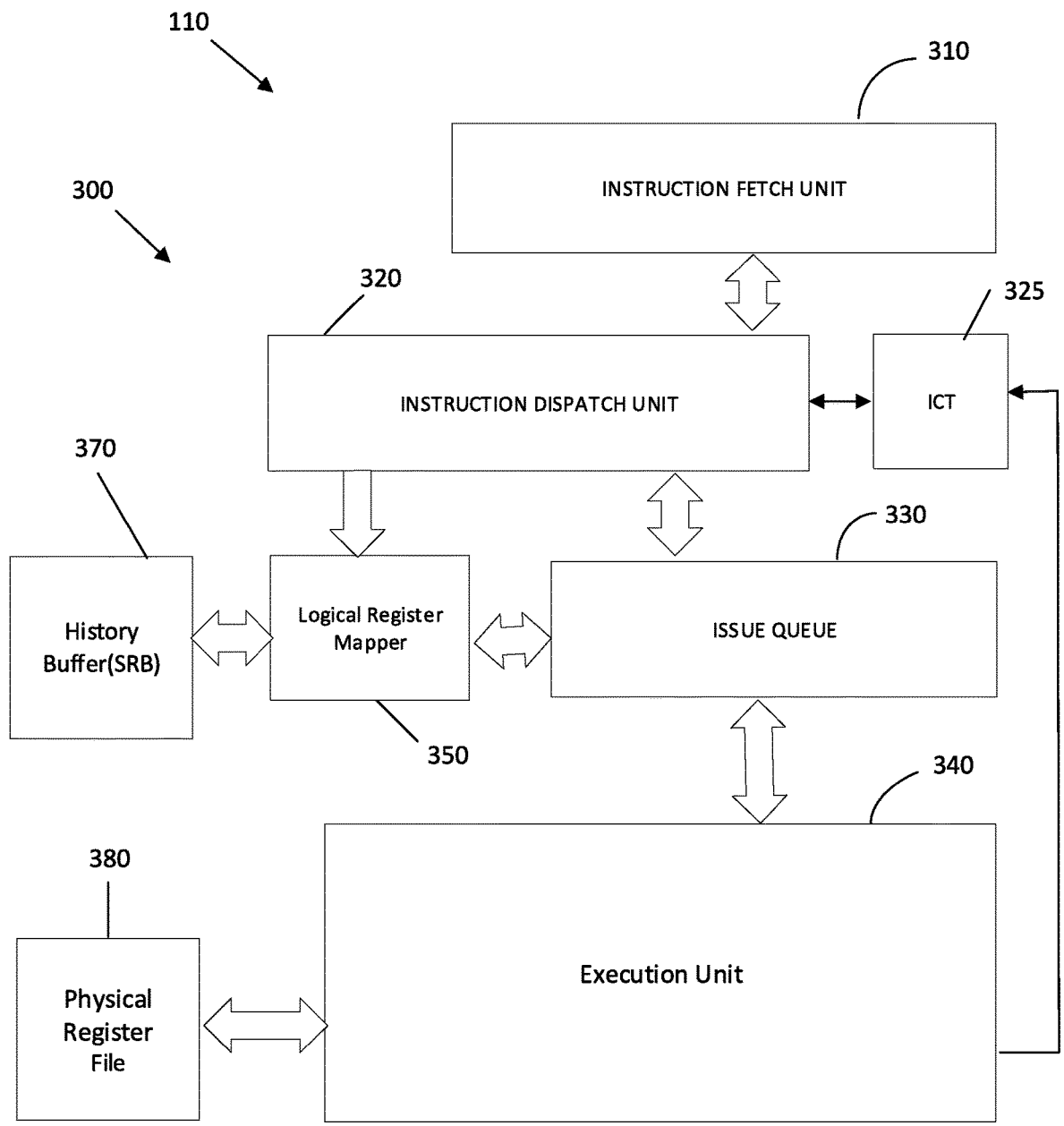
FIG. 3 illustrates a simplified block diagram of a portion of a multi-slice processor in accordance with an aspect of the disclosure in which certain aspects of the present disclosure may be practiced.

FIG. 3 illustrates a block diagram of a portion of a processor 110. The pipeline 300 in the processor 110 in FIG. 3 includes Instruction Fetch Unit 310, Instruction Dispatch Unit 320, Issue Queue (ISQ) 330, Instruction Completion Table (ICT) 325, Execution Unit 340, Logical Register Mapper 350, history buffer (SRB) 370, and Physical Register File 380. The Execution Unit 340 may include one or more queues to hold instructions for execution by the Execution Unit 340.

The Instruction Fetch Unit 310 fetches instructions to be executed by the processor 110 or processor slice and sends them to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data, for example, to be used in an operation specified in an instruction dispatched to an execution unit 340, and the result of the operation performed by the Execution Units 340 may be written to the designated target register entry in the physical register file 380.

When data is not ready, e.g., not within the appropriate data cache or register, delay can result as the ISQ 330 will not issue the instruction to the Execution Unit 340. For at least this reason, the Issue Queue (ISQ) 330 typically issues instructions to the Execution Units 340 out-of-order so instructions where the required data is available can be executed. Dispatch Unit 320 will stamp each instruction dispatched to the Issue Queue 330 with an identifier, e.g., identification tag (iTag), to identify the instruction. The Dispatch Unit 320 may stamp instructions with other information and metadata. The instructions (iTags) typically are allocated (assigned) and stamped in ascending program order on a per thread basis by the Dispatch Unit 320. Dispatch Unit 320 may also maintain a per thread instruction counter that increments for each instruction in a thread that is dispatched to the Issue Queue (ISQ) 330.

The Execution Unit 340 executes instructions out-of-order and when the Execution Unit 340 finishes an instruction, the Execution Unit 340 will send the finished instruction, e.g., iTag, to the ICT 325. The ICT 325 contains a queue of the instructions dispatched by the Dispatch Unit 320 and tracks the progress of the instructions as they are processed. In an embodiment, the ICT 325 has a completion tail pointer that keeps track of the progress of executing instructions in the thread, e.g., points to the next to complete instruction. The instruction entry in the ICT typically will not identify the instruction as complete until all older instructions in the thread are completed.

Logical register mapper 350 contains metadata (e.g., iTag, RFTag, etc.) which provides a mapping between logical register entries (LReg) and entries in physical register file 380. The RFTag is the pointer that correlates a logical register entry (LReg) to a physical register file entry. For example, when an instruction wants to read a logical register, e.g., the logical register mapper 350 tells issue queue 330, execution unit 340 and or other unit, where in the physical register file 380 it can find the data, e.g., physical register array entry.

There are circumstances when the instructions and corresponding entries in the logical register mapper 350 will need to be restored. For example, where an interruptible instruction, e.g., branch mispredict, occurs, the information in the logical registers will need to be flushed and restored. History buffer (SRB) 370 is provided to save a processor state before, for example, an interruptible instruction, so that if an interrupt occurs, control logic may recover the processor state to the interrupt point by restoring the content of registers, memory cache, and main memory. Logical register entries are restored from the history buffer (SRB) 370 to the logical register mapper 350. History buffer (SRB) entries to be recovered are read from the history buffer (SRB) and written to the logical register mapper 350. The history buffer (SRB) 370 restores the register meta data, iTag, and the RFTag pointers to the logical register mapper 350 so instructions know where to get the correct data.

In operation, when a new instruction with an instruction tag (iTag) produces a value to be stored in a logical register "x" after it is executed, the prior value in logical register "x"

is evicted from logical register "x", and the data and information associated with the instruction is stored in the history buffer (SRB) 370. That is, history buffer (SRB) 370 contains entries the logical register mapper 350 evicted from the logical register mapper 350 by younger instructions. History buffer (SRB) 370, in an embodiment, stores iTag and Register File tag (RFTag) information. The RFTag is a pointer that correlates an entry in a logical register to an entry in the physical register file 380. The information stored in the history buffer (SRB) 370 in an embodiment also includes the iTag and RFTag of the instruction that evicted the logical register entry (i.e., the evictor iTag and evictor RFTag) from the logical register. History buffer (SRB) 370 may store and track other information. The description of data stored by history buffer (SRB) 370 is only illustrative and different data may be stored depending upon design parameters of the processor. The history buffer (SRB) 370 has an interface to the logical register mapper 350 to recover the iTag, and register file tag (RFTag) (and other meta data) for each evicted logical register entry (LReg). The information is kept in the history buffer (SRB) 370 in a history buffer entry until the new instruction (evictor instruction) is completed. At which point there is no reason to keep the old entry in the history buffer, e.g., SRB 370, and the entry can be removed from the history buffer, as there is no flush recovery where the history buffer (SRB) entry could be recovered.

In one or more embodiments, a processor will have status and control (XFVC) registers. Status and control registers are registers that are used to store information on the status of the processor, system units, etc. and/or information used to configure and control the processor and/or system units. As discussed above, the mapping or rename of logical registers to physical register addresses is carried out by a mapper, e.g., mapper 350. The backup of previous states of each status and control register is stored in a history buffer 370, e.g., Save & Restore Buffer (SRB).

These status and control registers, as well as other registers, in one or more instances, are not renamed (mapped) as entire registers, but are renamed (mapped) by different bit ranges referred to as fields within the logical or architectured register. That is, multiple fields are stored in the same physical register entry. Multiple fields in an embodiment are stored within a single physical register file in predefined bit ranges, e.g., bit fields, that do not overlap. The fields can range from 1 bit, up to "N" bits, and can vary in size. In one or more embodiments, a row-column approach to the register file and rename logic permits large register file entries to be broken down into smaller groups allowing multiple fields to occupy the same entry in the physical register file. The fields/columns, in an embodiment, are predefined bit ranges within the physical register file. This column-row approach to the physical register file allows storage of multiple fields within a single register entry without overlap, preferable increasing storage efficiency and reducing the number of register file entries. In one or more embodiments, multiple fields (e.g., status and control register fields/entries/information) are mapped to the same physical register. This reduces the number of entries required to rename the in-flight fields, and reduces unused bits within a physical register file entry.

An example of multiple fields mapped (renamed) to the same physical register is shown in FIG. 4. FIG. 4 illustrates physical register 480 having four register entries 481-484, preferably four status and control (XFVC) registers, each broken up into multiple fields, preferably fields of the same size. In practice, the physical register 480 can have more or less entries/rows. In the example of FIG. 4, each register entry or row is divided into a plurality of columns, which in one or more embodiments can be chosen to match the smallest field size or the most common field size. In the example of FIG. 4, each row or register entry is thirty-two (32) bits wide, and supports writing up to eight (8) fields or columns within an entry/row, each field or column being four (4) bits wide. The bit field width of the register entry and the number of fields/columns in an entry/row can be more or less. The fields in an embodiment are predefined bit ranges within the register entry. The defined bit ranges of the various fields/columns permits the execution unit to know where to look for sourcing, and where to align write back data.

In FIG. 4, physical register 1 (481) has eight fields (fields 0-7) where field 0 is a four-bit field defined by bits 0:3, field 1 is a four-bit field defined by bits 4:7, field 2 is a four-bit field defined by bits 8:11, etc., with each field defined by a four bit-field as shown in FIG. 4. FIG. 4 is only an illustrative example of a physical register, and other column sizes and the number of columns could be different. Physical register 480 may have more or less entries and each entry may have more or less fields defined by more or less predefined bits, and/or by different predefined bit ranges. Physical register 480 can support writing any combination of fields that do not share any bits in their predefined range, even, in an embodiment, if they are part of different logical registers.

Each row in the physical register file is individually addressed with a Row Tag (rTag), which represents the row number within the register file. Each column can be enabled or disabled (deallocated) with a column mask, which is a mask of bits that enable or disable a column within a row. When data is written to the register file, only enabled columns, e.g., as determined by the column mask, within a target row will be written and the rest of the columns in the row will retain their current values. By this process multiple fields or columns can be used per row, e.g., per register entry/row. Fields that span multiple columns will set the mask to write to the correct number of adjacent columns within a row.

A mechanism in an embodiment is provided, preferably in the mapper, to track the number of fields or columns allocated and deallocated from each physical register file entry. One embodiment of a mechanism 565 to track the number of fields or columns allocated and deallocated from the physical register file 480, also referred to as a Free List, is shown in FIG. 5. The Free List 565 of available register file entries contains a column use for each row. The Free List 565 and column use information can be used to allow additional fields to write into open columns within a row in future cycles. In the example of FIG. 5, where each physical register file can hold up to eight fields or columns, an eight-bit column (field) mask is used to track entry allocation and deallocation. In FIG. 5, an embodiment of tracker mechanism/table 565 is shown where the rTag column represents the physical register entry number i.e., the row, the Column Usage column contains the eight-bit usage code to track the fields or columns that are allocated and deallocated, and the Free column identifies whether the register (entry) has any fields that are allocated, or whether the register (entry) is completely deallocated.

At allocation, one or more bits in the eight-bit field of the Column Usage column in the free list 565 are turned "on" (represented by a high bit or "1"), where each bit turned "on" (assigned a "1") is equal to the number of fields written in that entry, and in an embodiment the column that is written to in the identified row. So for example, in FIG. 5, rTag (register entry row) 0 has the first four bits in the Field Usage "on" indicating the four fields that are written to, while rTag (register entry row) 2 has the first bit in the Field Usage "on" indicating that the first field/column in row 2 of the register file has been written. When a field is deallocated, a 0 is inserted into the column corresponding to the field that was deallocated, thus reducing the number of bits that are activated (on) by one. For example, if rTag (register entry row) 2 in FIG. 5 has a field deallocated, a zero is inserted for the column that was deallocated and the field usage code will show all zeros (like rTag (register entry row) 1) and the Free Column will change to Yes (Y) indicating that the identified rTag (register entry row) is free. Accordingly, when all the bits have turned to zero as shown in rTag 1, the entire entry is free.

The free list in the mapper contains column usage for each row/entry to allow other columns in the row/entry to be used. This process where additional columns (fields) within the row/entry can be used and inserted into a row is referred to as stitching. The mapper can assign new register entries to any open column range wide enough to fit a field. The mapper in one or more embodiments contains logic to track the rTag and column mask, as well as the instruction tag for each field.

As described in connection with FIGS. 4 and 5, two or more fields can be combined and written to the same physical register. Disclosed is a system, architecture, and technique which applies a row-column approach to the register file and rename logic to allow large register file entries to be broken up into small groups, allowing multiple fields to occupy the same register entry in the register file, thus reducing the number of entries to rename the in-flight fields, and reducing the unused bits within a register entry.

In one or more embodiments, a register file is utilized where each row is wide enough to contain the largest fields in the register, e.g., the largest fields in the status and control register. In one example, each row is thirty-two bits wide, although other bit widths are contemplated. Each row, in one or more aspects, is divided into columns. The bit width of the rows in one or more embodiments preferably matches the smallest or most common field size, although other bit widths are contemplated. Each row is individually addressed with a Row Tag (rTag), which represents the row number within the register file. Each column can be enabled or disabled with a column mask, which is a group of bits that will enable or disable a column within a row.

When data is written to the register file, only the columns enabled by the column mask within a target row will be written, the rest of the columns within that row will retain their current value. As multiple columns within a row can be enabled, multiple fields can be written per row. Fields that are larger than a single column will set the Column Mask to write to the correct number of adjacent columns within the row. The free list of available register file entries will also contain a column use for each row, which can be used to allow additional fields to write into open columns within a row in future cycles.

Figure 6:
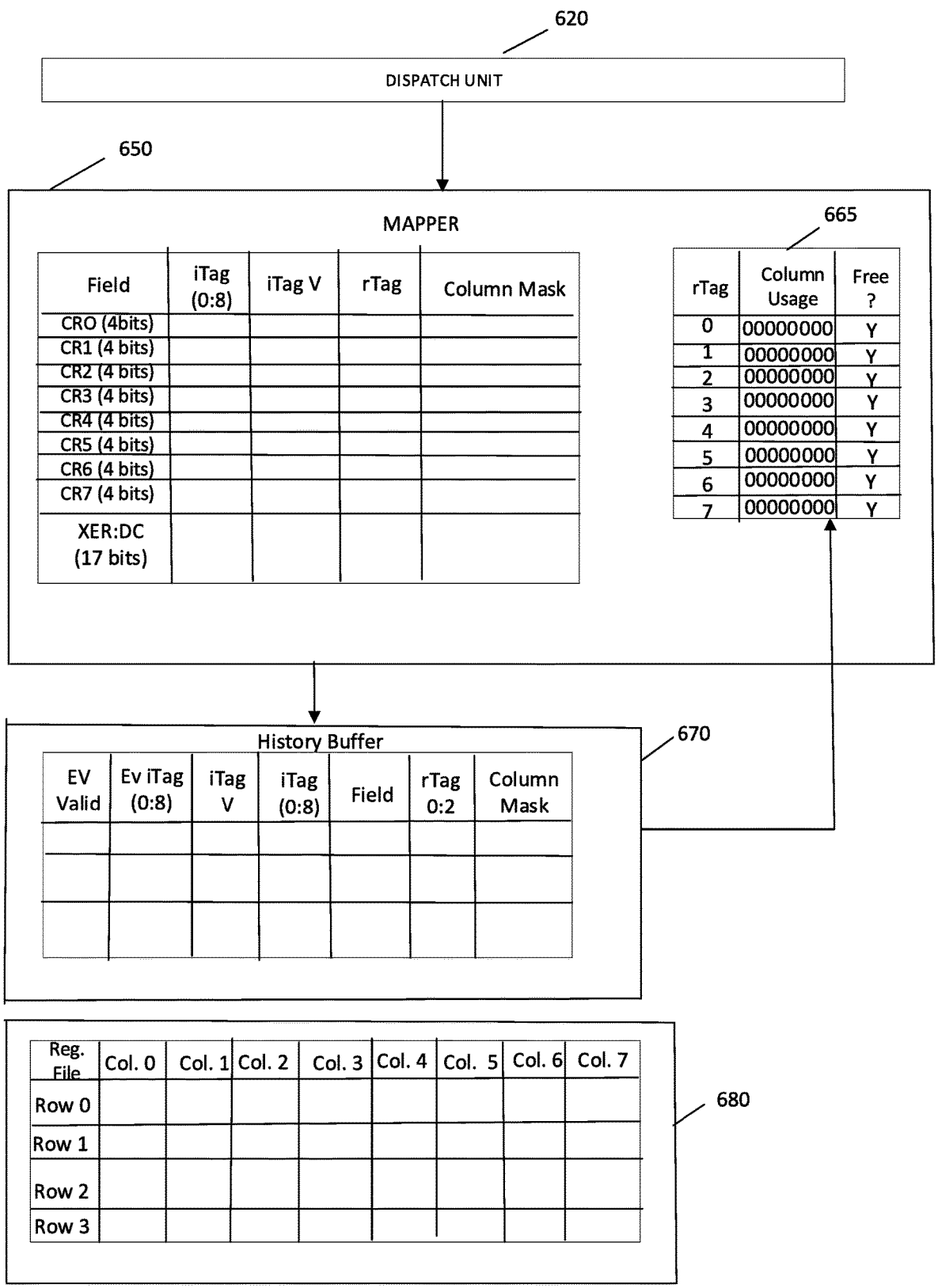
FIG. 6 illustrates a simplified block diagram of an embodiment of a mapper, history buffer and register file of a processor.

FIG. 6 illustrates a block diagram of a simplified mapper 650, simplified dispatch unit 620, simplified, history buffer (SRB) 670 and simplified physical register file 680. The register file 680 is configured as in FIG. 4 with multiple rows and columns representing address locations to store data. More specifically, in the example of FIG. 4 and FIG. 6, each row of the register file has eight fields or columns that are four (4) bits wide. Mapper 650 tracks and correlates logical register entries to address locations in the physical register file. As the register file 680 is divided into rows and columns that create numerous fields, the mapper 650 typically contains more than two fields and may contain more fields, for example twenty (20) or more fields. The fields in mapper 650 correspond to the columns, preferably the predefined columns, in the register file 680. The data contained in each field of mapper 650 in one or more embodiments includes a bit range for iTag information, a bit range for rTag information, and a bit range for the column mask, as well as other metadata and bit ranges for other information. The mapper 650 in FIG. 6 shows eight CR fields, CR0-CR7, and an XER:DC field. The fields CR0-CR7 are each four bits wide and field XER:DC which is 17 bits wide. The physical register file 680 is also shown in FIG. 6 with the rows or wide entries subdivided into columns or fields to hold the register data, preferably status and control register data.

The mapper 650 also contains Free List 665 which identifies which rows have columns, e.g., fields, that are empty and available for use, e.g., available to be written to by an XFVC field. Free List 665 has Row (or register) Tags 0-7, a column usage mask to identify which columns in the row are occupied, and a free indicator to indicate whether the register is empty or if any column is being used in the row. The physical register file 680 is also shown in FIG. 6 with the rows or entries subdivided into columns or fields to hold the register data, preferably status and control register data.

In the example of FIG. 6, a portion of the history buffer (SRB) 670 is shown that has one or more write ports that can receive data from mapper 650. In an embodiment, when data is evicted from the mapper 650, history buffer (SRB) 670 saves (writes) data from the mapper 650 including iTag information, field information, e.g., field/column identification, rTag information, and column mask data. In addition, the history buffer 670 saves information on the evictor iTag, which is the instruction that evicts the entry from the mapper to the history buffer. Other metadata can be saved and collected in the history buffer (SRB) 670. In an embodiment, the history buffer 670 has a 9 bit range for the evictor iTag, 9 bit range for the iTag, 2 bits for the rTag, and on 8 bit range for the Column Mask. Other bit ranges are contemplated depending upon the processor design and architecture.

The use of a processor and the handling of data and instructions in the system will now be discussed in connection with FIGS. 6-12. The register file in one or more embodiments are status and control registers, and the width of the register file in an aspect is large enough, e.g., has sufficient bit width, to contain the largest register fields, e.g., 32 bits wide. A row-column approach to the register file and rename logic allows the large register file entries to be broken into smaller groups, allowing multiple fields to occupy the same entry/row in the register file.

When starting out, as shown in FIG. 6, all entries in the register file 680 are free as no data has been saved, and no entries in the mapper have been allocated. At the start, the mapper 650, using information from the Free List 665, sends a hole count; i.e., the number of register file rows with no columns occupied, to the dispatch unit 620. In this processor example, four instructions can dispatch per cycle. Since all Tags in the Free List are free, the first four tags (shown as Tags 0-3 in Free List 665) are ready to be used by the dispatch unit 620.

Figure 7:
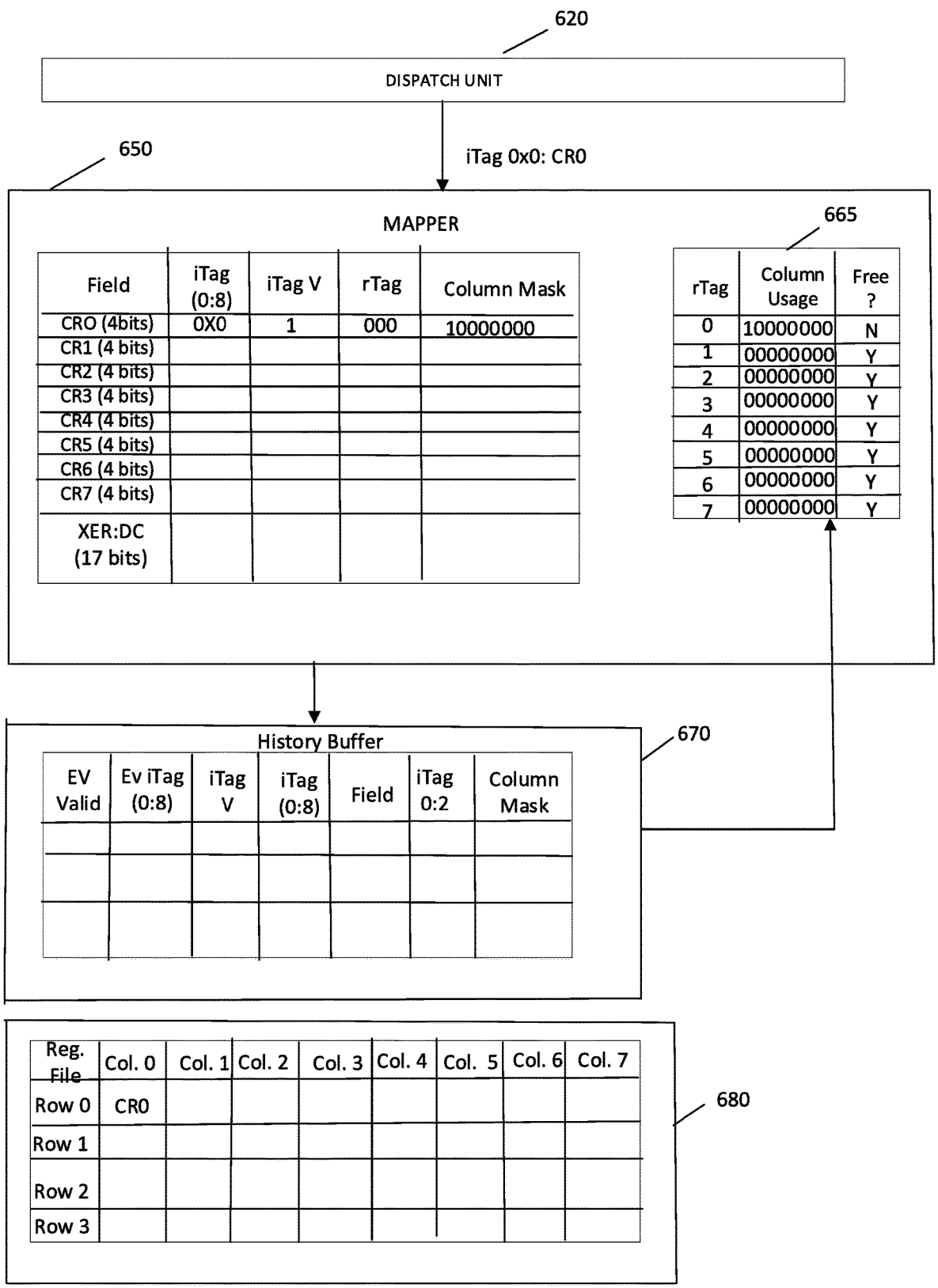
FIG. 7 illustrates a simplified block diagram of an embodiment of a mapper, history buffer and a register file undergoing a data handling operation.

Dispatch Unit 620 issues its first instruction, iTag 0x0 with a CR0 destination to write the result as shown in FIG. 7. The mapper 650 allocates Tag 0, col. 0 as shown for the field CR0 and uses the column mask 1000000 to indicate that Row 0, Column 0 in the register file 690 corresponds to, contains the data for, or is allocated field CR0. The column mask data is also illustrated in the Tag 0 entry in the Free List 665, and since a field is now being used (as illustrated by column usage data) the free column is changed to a No to indicate the column is not free, i.e., that at least one column in the row contains data. The hole count drops by one as Tag 0 is in use. The next four tags, e.g, entries 1-4 shown in the Free List 665, are ready to be allocated on the next cycle.

Figure 8:
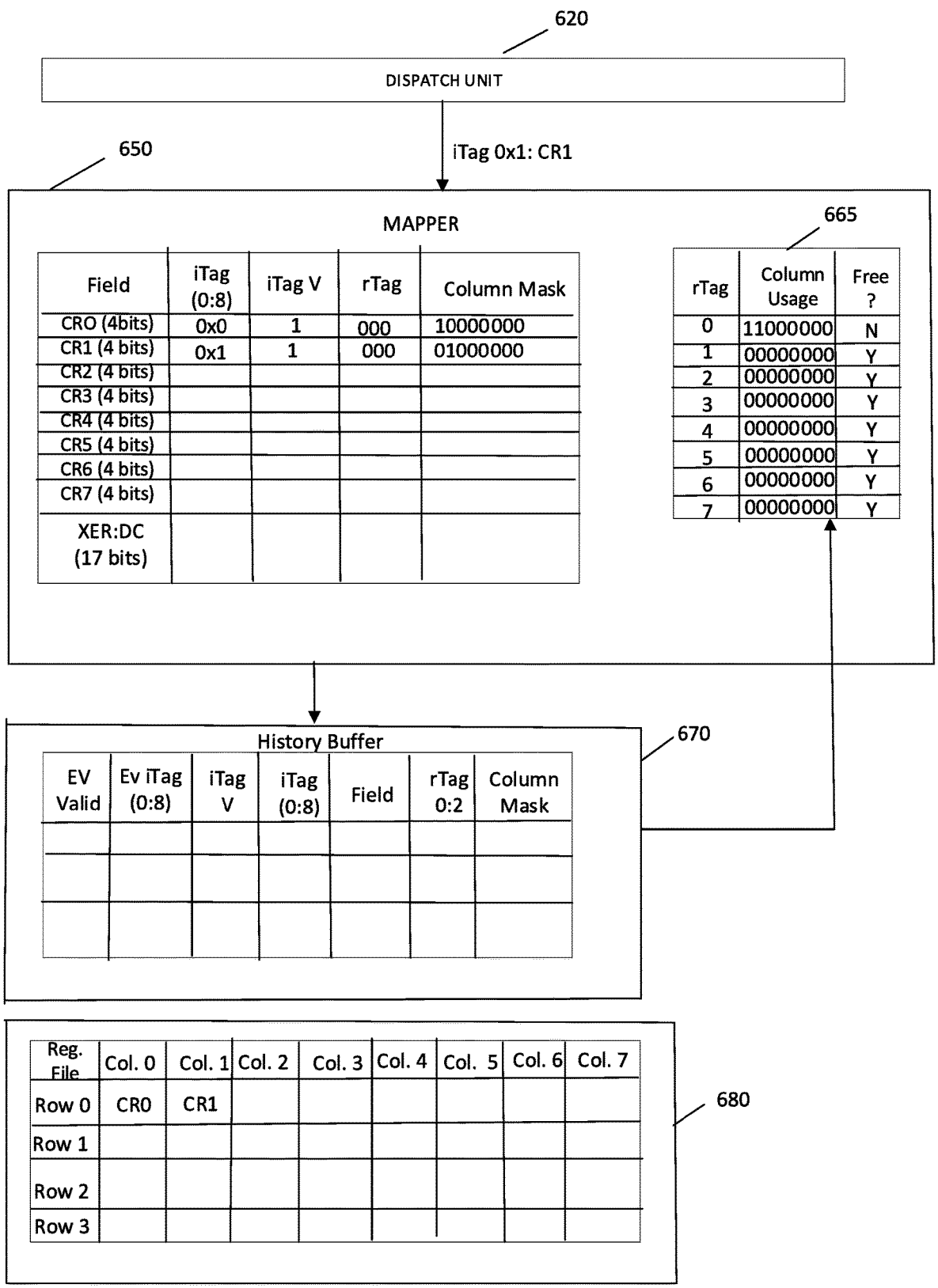
FIG. 8 illustrates a simplified block diagram of an embodiment of a mapper, history buffer, and a register file undergoing a data handling operation.

Next, the dispatch unit issues another instruction, iTag 0x1 with a CR1 destination, as shown in FIG. 8. Since there is space, e.g., fields, available in row 0 of the register file that will fit CR1, stitching logic in mapper 650 assigns a new field to Tag 0, namely column 1. Mapper 650 allocates Tag 0, Col. 1 as shown in field CR1 of the mapper 650 where CR1 field corresponds to Row 0, Column 1 in the register file 680. The mapper 650 allocates another column/field in the same row 0 in the register file 680. The hole count remains the same since the number of rows available in the physical register file 680 did not change since the mapper 650 allocated a different field/column in the same row. Entries 1-4 in the Free List 665 are ready to be allocated on the next cycle.

Figure 9:
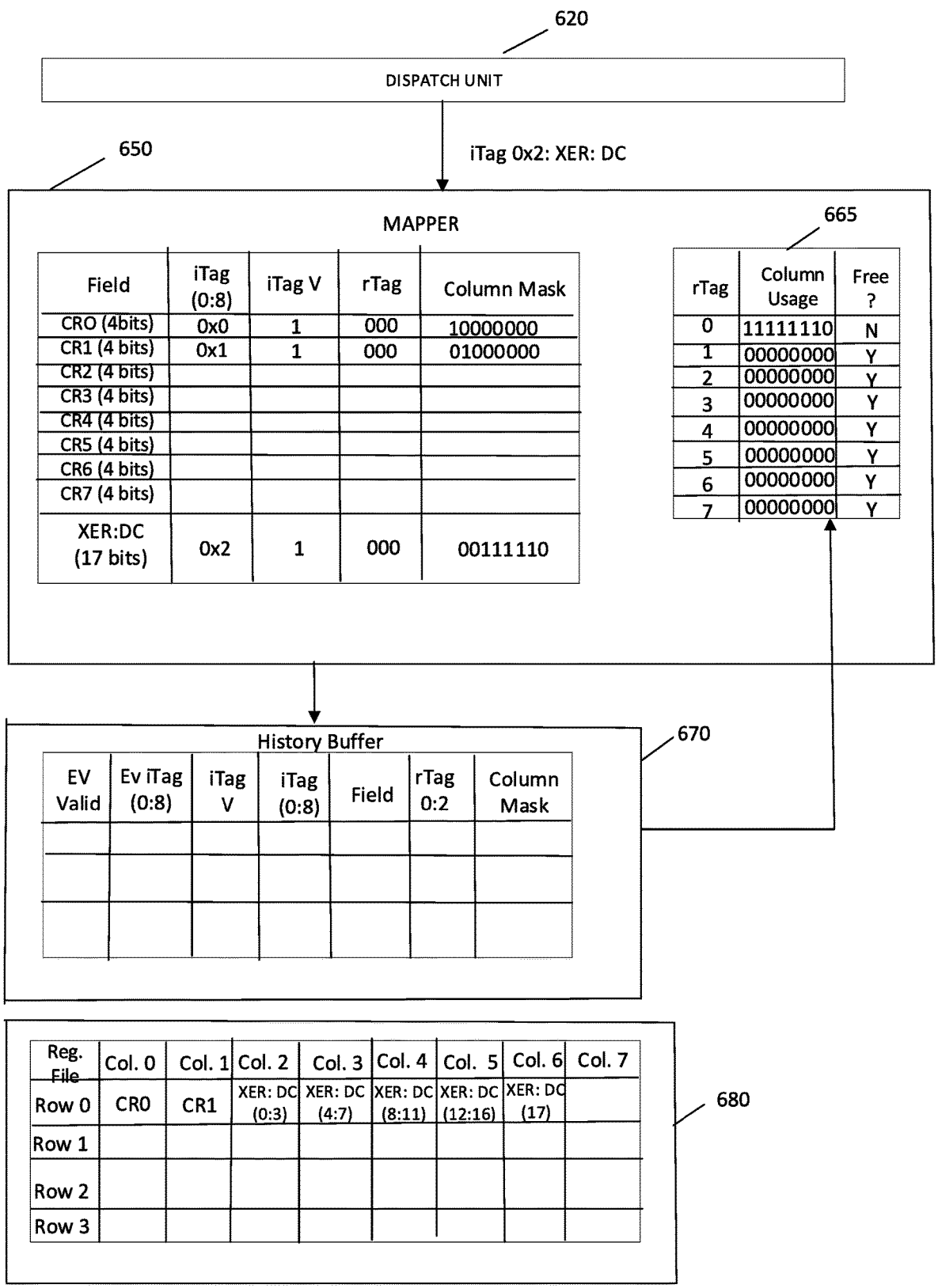
FIG. 9 illustrates a simplified block diagram of an embodiment of a mapper, history buffer, and a register file undergoing a data handling operation.

Thereafter, as illustrated in FIG. 9, another instruction, iTag 0x2 is dispatched with a XER: DC destination field that is 17 bits wide. This field is larger than the columns in the register file 680. The mapper 650 stitches the entry into row 0 of the physical register file 680 taking contiguous columns 2-6 as shown in register file 680 in FIG. 9. The mapper 650 tracks the rTag as 000 since it is assigned to Row 0 and records the column mask 00111110 since it is assigned columns 2-6. The hole count remains the same since the number of rows available in the register file 680 did not change since mapper 650 allocated multiple columns from the same row 0. The column usage in the Free List 665 illustrates all columns except for Column 7 in Row 0 in the register file 680 are being used. It should be noted that if Row 0 in the register file 680 has no room, the entry would be written to columns 0-4 of row 1, and the hole count would decrease by 1.

Figure 10:
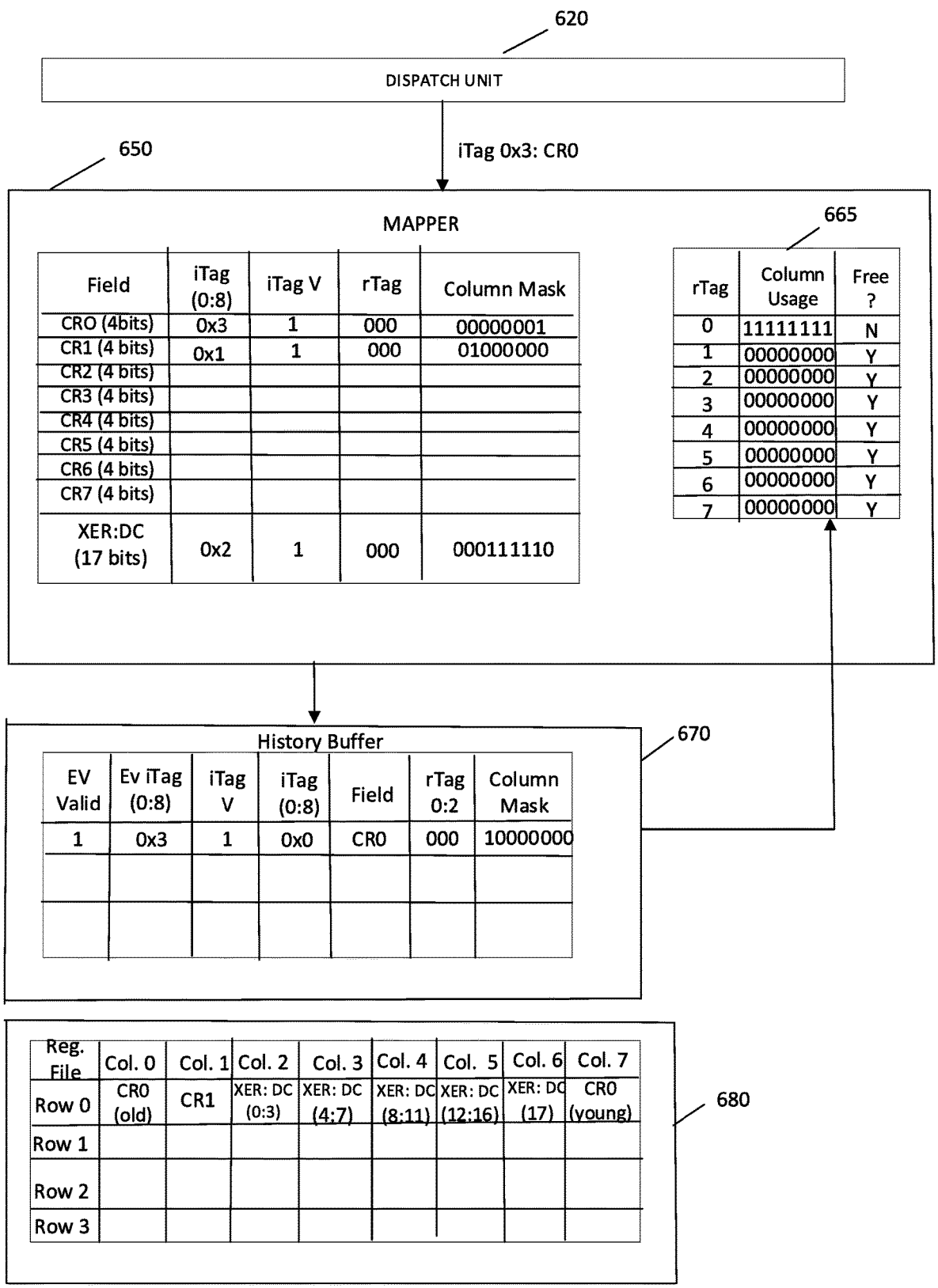
FIG. 10 illustrates a simplified block diagram of an embodiment of a mapper, history buffer, and a register file undergoing a data handling operation.

FIG. 10 illustrates a simplified example of when the mapper 650 evicts an entry. In the example of FIG. 10 dispatch sends new instruction 0x3 with a CR0 destination field, e.g., iTag 0x3: CR0. Mapper 650 already has an entry in field CR0. The new (younger) entry CR0 (iTag 0x3) evicts the old entry CR0 (iTag 0x0) from the mapper 650. The old entry CR0 (iTag 0x0) is evicted to the history buffer 670. The iTag, Field, rTag, and column mask from instruction 0x0: destination CR0 is written to the history buffer, as well as information identifying the evictor iTag (EV iTag), i.e., iTag 0x3. Stitching logic in the mapper 650 assigns the new field CR0 to Tag 0, Column 7. The physical register 680 is as illustrated in FIG. 10 with old CR0 (iTag 0x0) in Row 0, Column 1 and new CR0 (iTag 0x3) in Row 0, Column 7. The Free List 665 will show all columns in row 0 in use as shown in FIG. 10.

Figure 11:
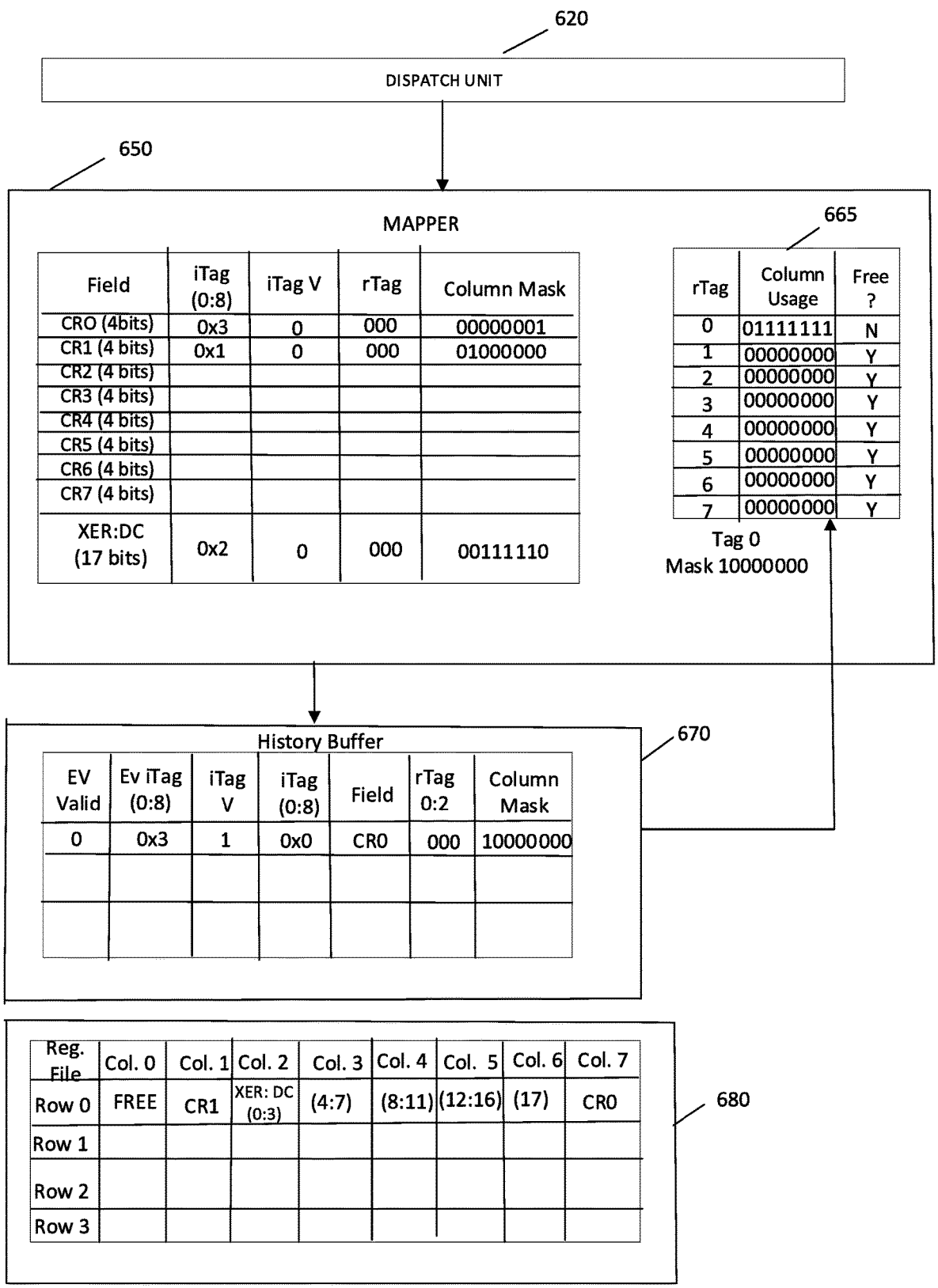
FIG. 11 illustrates a simplified block diagram of an embodiment of a mapper, history buffer, and a register file undergoing a data handling operation.

FIG. 11 shows an example where instruction iTag 0x3: CR0 completes. As shown in FIG. 11, EV iTag 0x3 in entry 1 of the history buffer 670 completes, and the tag and column mask of the instruction it evicted, i.e., 0x0: CR0 is broadcast to the Free List 665. Tag 0, Column 0 corresponding to the evicted instruction 0x0 is freed up (deallocated) as shown in the register file 680, and by the column usage in the Free List 665. Row 0, Column 0 in the register file is deallocated and free for use. The other entries in the register file remain because they contain architected data. The evictor iTag of the corresponding entry in the history buffer 670 is marked invalid and the history buffer (SRB) entry will be cleared.

Figure 12:
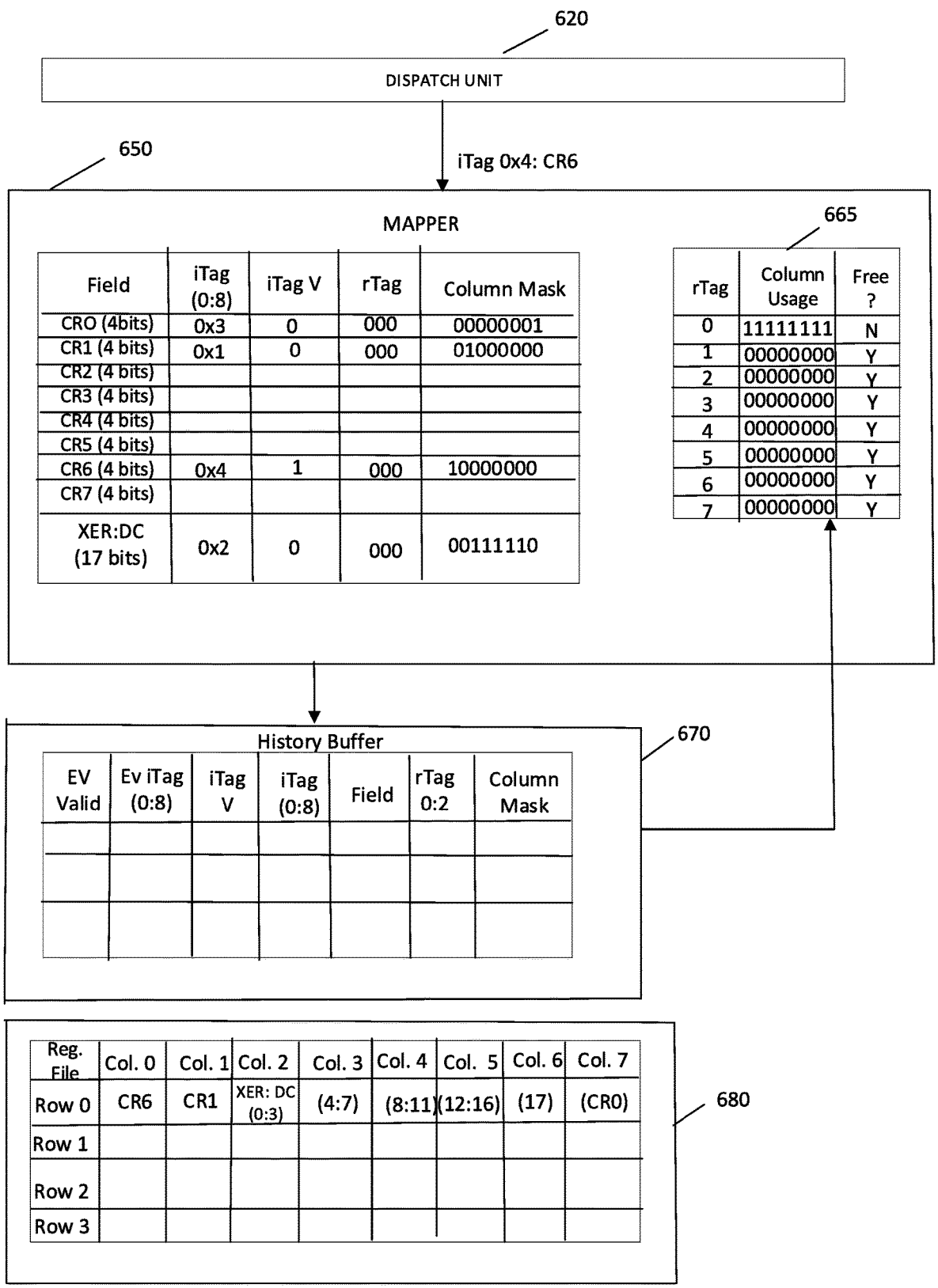
FIG. 12 illustrates a simplified block diagram of an embodiment of a mapper, history buffer, and a register file undergoing a data handling operation.

Another instruction, iTag 0x4 dispatches with a CR6 field destination as shown in FIG. 12. Since Row 0, Column 0 has been deallocated, the mapper stitching logic can use the recently freed entry at Row 0, Column 0 to hold field CR6. The mapper 650 will track and record the iTag, rTag, and column mask information as shown in FIG. 12. The column usage in the Free List 665 will be updated to indicate that all entries in Row 0 of the register file are being used as shown in FIG. 12.

Figure 13:
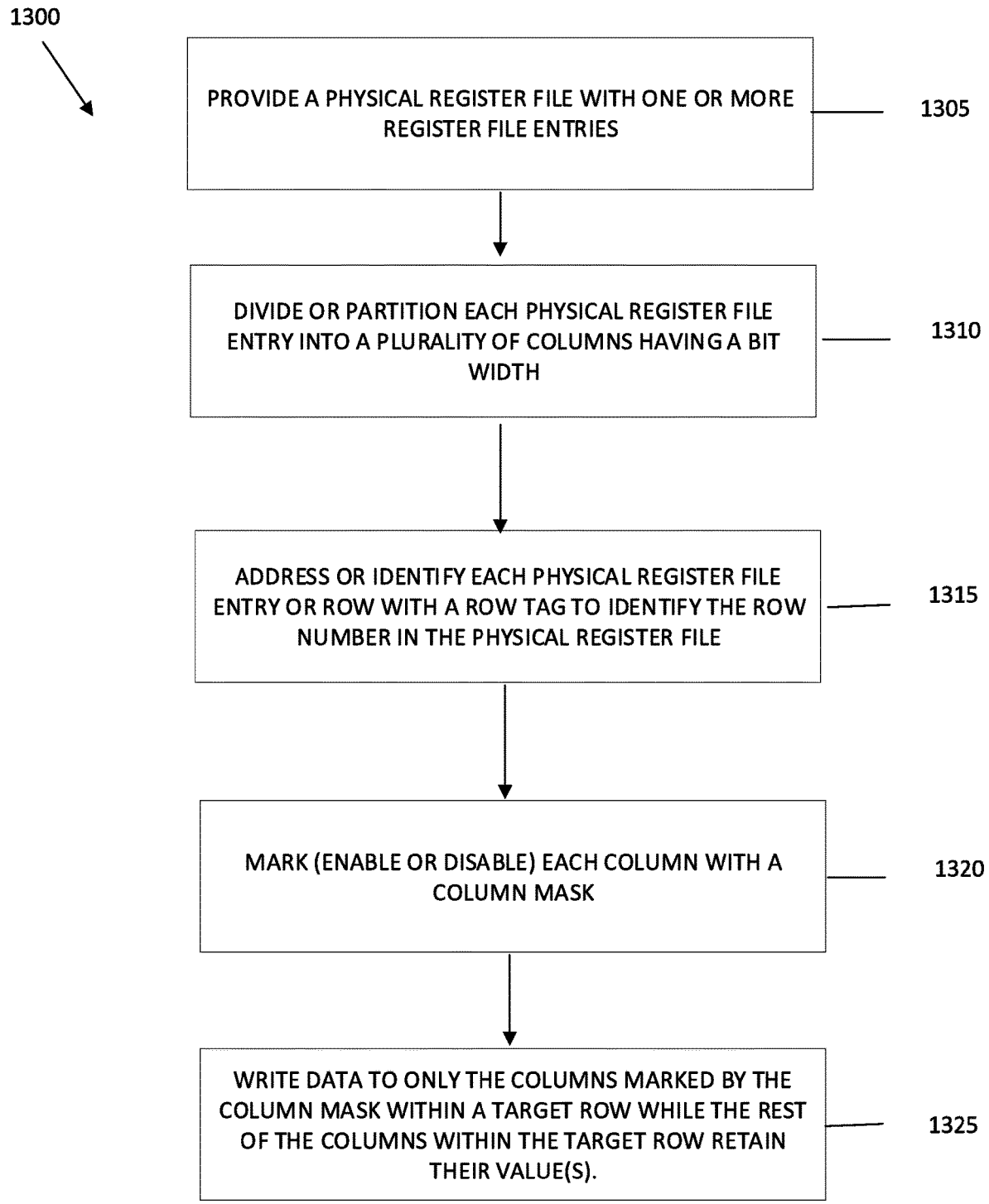
FIG. 13 illustrates a flow chart of an illustrative method of handling data in a processor where the entries in a register file have been subdivided into a plurality of fields arranged as columns in each register entry row.

FIG. 13 is an exemplary flowchart in accordance with an embodiment illustrating and describing a method 1300 of handling data in an information handling system, and more specifically a method of allocating and writing multiple fields to a register file. While the method 1300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 13, but the process may be integrated and/or one or more steps may be performed together, simultaneously, or the steps may be performed in the order disclosed or in an alternate order.

A method 1300 of handling data in a processor is illustrated in FIG. 13, and more specifically a method of combining two or more fields into a single entry in a register file. The method 1300 of FIG. 13 in one or more embodiments can reduce the number of register files required to rename the inflight fields, and reduces the unused bits within a register entry/row.

The method 1300 as shown in FIG. 13 includes at 1305 providing a register file with one or more register file entries for strong data. In an embodiment, each entry, also referred to as a row, is wide enough to contain the largest fields in the register, and in an aspect is wide enough to contain the largest fields in one or more status and control registers.

In one or more embodiments, at 1310, each row in the register file is divided into one or more columns. In an aspect, each row is adapted and configured to be divided into one or more columns. Each column in the register file may be one or more bits wide, e.g., "n" bits wide, and, in an embodiment, the width of the one or more columns is chosen to match the smallest field size, or in an alternative embodiment to match the most common filed size. The width of the columns can be based upon other criteria. The bit width of each column in the register file, and/or in the register row, preferably is the same. In an aspect, the column width can be varied across the row.

In an embodiment, at 1315, each row can be addressed, preferably individually addressed, with a Row Tag (rTag), which identifies and represents the row number within the register file. In an embodiment, at 1320, each column can be enabled or disabled with a column mask, which is a mask of bits that will enable or disable a column within a row. In one or more embodiments, at 1325, data is written to only the columns enabled by the column mask within a target row while the rest of the columns within the target row retain their value. By having multiple columns enabled by the column mask, multiple fields/columns can be written per row. In an aspect, fields that span multiple columns will utilize a column mask to write to the correct number of adjacent columns within a row. A Free List is associated with the mapper and contains a column use for each row to identify the available register file entries. Additional fields can be written to open columns within a row.

While the illustrative embodiments described above are preferably implemented in hardware, such as in units and circuitry of a processor, various aspects of the illustrative embodiments may be implemented in software as well. For example, it will be understood that each block of the flowchart illustration in FIG. 13, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems that perform the specified functions or steps, or by combinations of special purpose hardware and computer instructions.

The programs described herein are identified based upon the application for which they are implemented in a specific embodiment of the invention. However, it should be appreciated that any particular nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, circuitry, chip, code, or portions thereof, which comprises one or more circuits, and/or executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, comprising:
providing a physical control and status register file with one or more physical register file rows for storing data, each physical register file row having a bit width;
partitioning each physical register file row into a plurality of columns, each one of the plurality of columns within each physical register file row defining a physical register file field having a bit width less than the bit width of the physical register file row such that a plurality of physical register file fields are formed in each physical register file row, wherein the bit width of each physical register file field is a plurality of bits;
identifying each physical register file field with a row identifier to identify the row in the physical register file;
enabling one or more of the plurality of columns within a target row of the physical register file using a column mask to enable writing one or more columns within the target row of the physical register file;
writing data in one or more of the plurality of columns enabled within the target row of the physical register file;
providing a logical register mapper for mapping physical register file fields to logical register entries, the logical register mapper having a plurality of logical register mapper entries, each logical register mapper entry for mapping a corresponding single register file field and having multiple bits for storing information, wherein the logical register mapper includes a free list to identify each of the one or more columns of each physical register file row that are available to be written; and
using the free list to identify each of the one or more columns of each physical register file row that are available to be written.

2. The method of claim 1, further comprising revising data in only the one or more of the plurality of columns enabled by the column mask within the target row of the physical register file while the rest of the plurality of columns within the target row retain their values.

3. The method of claim 1, wherein the bit width of each column in the physical register file is the same.

4. The method of claim 1, wherein the bit width of each column is selected to be the same as the bit width of the smallest register field size or the most common register field size.

5. The method of claim 1, further comprising writing data in a column in a physical register file row that already has data written to another column in the physical register file row.

6. The method of claim 1, further comprising writing data in a plurality of columns in a physical register file row.

7. The method of claim 1, further comprising writing data into another row of the physical register file in response to insufficient space being available in a row of the physical register file that already has data in one or more columns.

8. The method of claim 1, further comprising deallocating columns within the physical register file row using a column mask.

9. A system for processing information, the system comprising:
   at least one processor for processing instructions, the processor comprising:
   one or more physical register files, each physical register file having a plurality of rows wherein each row is divided into a plurality of columns, each one of the plurality of columns within each physical register file row defining a physical register file field for storing data having a bit width less than the bit width of the physical register file row such that a plurality of physical register file fields are formed in each physical register file row, the bit width of each physical register file field having a plurality of bits;
   one or more logical register mappers for mapping physical register file fields to logical register entries, each logical register mapper having a plurality of logical register mapper entries, each logical register mapper entry for mapping to a corresponding single physical register file field and each logical register mapper entry having a plurality of multi-bit fields for storing information; and
   wherein the one or more logical register mappers have a free list to identify each of the columns of each physical register file row that are available to be written.

10. The system of claim 9, wherein at least one of the logical register mappers is configured and adapted to store for each field a physical register file row identifier that identifies a row within the physical file register and a column mask to enable or disable a column within the row of the physical register file, the row identifier and the column mask identifying a physical register file field corresponding to the logical register mapper entry.

11. The system of claim 9, wherein the free list stores column usage data indicating the entries within the physical register file that contain data.

12. The system of claim 9, wherein the processor is configured and adapted to write data into one or more adjacent columns of a target row in the physical register file using a column mask.

13. The system of claim 9 further comprises one or more history buffers having a plurality of entries for storing logical register mapper entries evicted from at least one of the logical register mappers.

14. The system of claim 13, wherein the history buffer stores physical register file field data, row identifier information, and a column mask of the logical register mapper entry evicted from the logical register mapper.

15. A system for processing data, the system comprising:
   at least one processor for processing instructions;
   a physical register file having a plurality of rows, each row partitioned into a plurality of columns, each one of the plurality of columns within each physical register file row defining a physical register file field for storing data having a bit width less than a bit width of the physical register file row such that a plurality of physical register file fields are formed in each physical file row, the bit width of each physical register file field having a plurality of bits to store the data;
   one or more logical register mappers for mapping each logical register entry to a physical register file field, each logical register mapper having a plurality of entries, each logical register mapper entry having a plurality of fields for storing information;
   one or more history buffers associated with the one or more logical register mappers, each history buffer having a plurality of entries for storing one or more of the fields evicted from at least one logical register mapper entry in the one or more logical register mappers; and
   computer readable storage medium comprising program instructions that when executed by the processor cause the processor to store the data in a physical register file field.

16. The system of claim 15, further comprising program instructions that when executed by the processor cause the processor to identify each physical register file field with a row tag to identify the row in the physical register file and a column mask to identify each column in each physical register file row.

17. The system of claim 16, further comprising program instructions that when executed by the processor cause a processor to write data to only the one or more columns marked with the column mask within a targeted row in the physical register file while the rest of the columns within the target row retain their values.

* * * * *